United States Patent Office 3,551,047
Patented Dec. 29, 1970

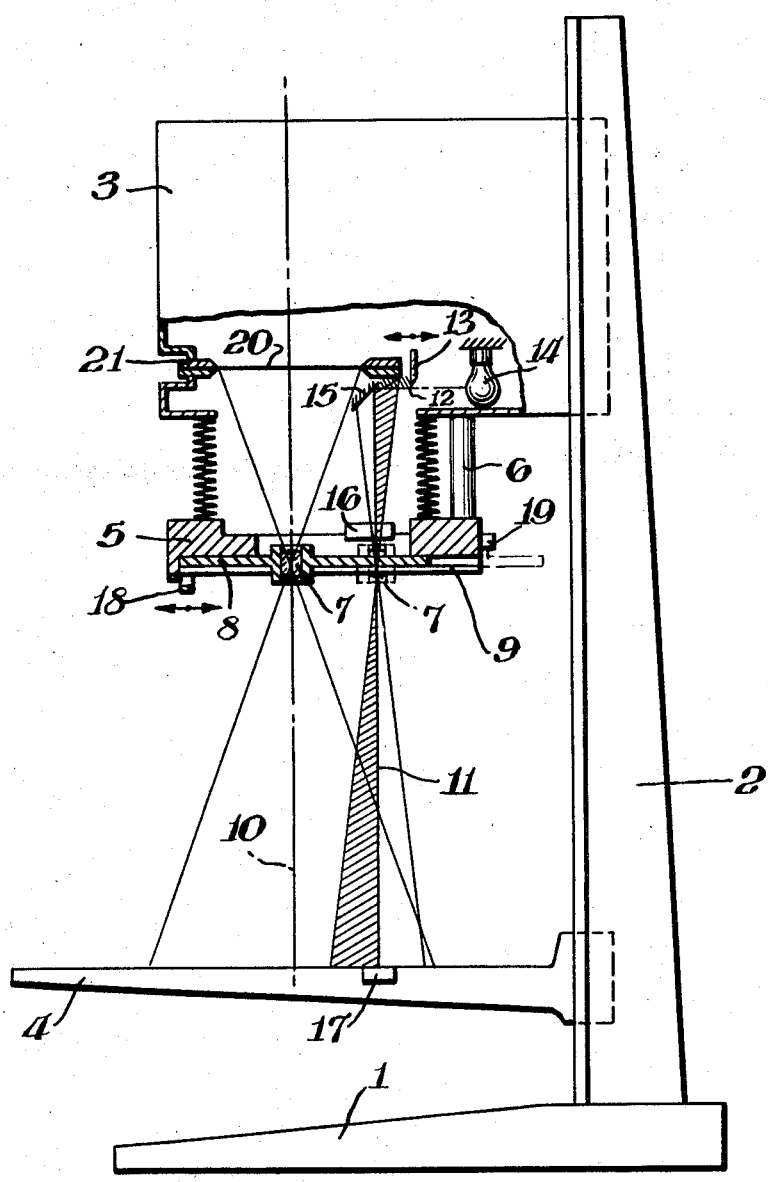

3,551,047
ELECTRONIC FOCUSING ARRANGEMENT FOR PHOTOGRAPHIC ENLARGERS
Siegfried Barbieri and Gilbert Durst, Brixen, near Bozen, Italy, assignors to Durst AG, Fabrik Fototechnischer Apparate, Bolzano-Bozen, Italy
Filed May 17, 1968, Ser. No. 730,116
Claims priority, application Italy, Mar. 7, 1968, 2,521/68
Int. Cl. G03b 27/34
U.S. Cl. 355—59      6 Claims

ABSTRACT OF THE DISCLOSURE

An electronic focusing arrangement includes a measuring light path parallel to the copying light path with the measuring light having its own light source with a finely adjustable shutting surface disposed along the light axis. The arrangement also includes a deflecting mirror, a diphragm arranged in the proximity of the objective lens and movable normal to light axis and test edge, and a light receiver on the projection table.

BACKGROUND OF INVENTION

Copending application Ser. No. 491,663, filed Sept. 30, 1965, now Pat. No. 3,387,534, relates to an apparatus for the automatic focusing of an image to be reproduced by means of an objective lens, wherein a testing edge is arranged in an original copy window, and wherein on the projection plane is disposed at least one photoelectric cell and in or near the objective lens one diaphragm is movable at right angles to the optical axis.

SUMMARY OF INVENTION

An object of this invention is to provide an arrangement of the above type with an improved focusing arrangement.

The present invention concerns a particularly advantageous embodiment of the focusing apparatus disclosed in the above application where a measuring light path with its own light source is arranged parallel to the optical copying light path. The testing edge, the movable diaphragm and the light receiver are stationarily arranged in the measuring light axis and the objective lens is moved only for the purpose of the focusing, while it otherwise remains in the copying light path.

A further embodiment of the invention is that for focusing, the enlarging objective lens per se is not used but instead in the measuring light path a variable focus lens is stationarily arranged, which need only be designed for a small picture angle and whose time of burning is fitted exactly at one time to the enlarging objective lens.

THE DRAWINGS

The single figure shows a side view of the electronic focusing arrangement of the invention.

DETAILED DESCRIPTION

The disclosure of copending application Ser. No. 491,663, filed Sept. 30, 1965, now Pat. No. 3,387,534, is incorporated herein by reference thereto.

The figure shows an enlarging apparatus with a column 2 standing vertically on base 1 upon which the apparatus head 3 and the projection table 4 are movably supported vertically. On the lower side of the apparatus head 3 there is arranged the objective lens carrier 5 which is movable on column 6 and on a second column (not shown) toward and away from the original copy 20. The objective lens 7 is mounted to a slide 8 which is movably supported together with the straight conduit 9 and a further conduit (not shown) lying opposite and arranged symmetrically to the copying light axis 10. The slide has two rest positions. In the outer position the objective lens 7 is situated exactly centrically to the copying light axis 10 and reproduces the original copy 20 which is contained in the original copy holder 21 and is illuminated in a known manner by a copying light apparatus arranged above same holder, for the purpose of printing on the projection table 4. In the inner position lens 7 is centric to the measuring light axis 11 and reproduces the shutting surface on the input surface of the light receiver 17 in such a manner that the image of the test edge 12 comes to rest in the center of the this input surface. The rays of the measuring light source 14 illuminate the shutting surface 13 and half of them are held back by it. The other half of the rays are deflected downward by the deflecting mirror 15, penetrate movable diaphragm 16, objective lens 7, and fall on the measuring surface of the light receiver 17, half of which is illuminated. The projected image of the test edge moves in synchronism with the movable diaphragm 16 as long as the focal plane of the optical system does not coincide with the measuring surface of the light receiver 17. The image movement causes in the light receiver 17, an alternating current which serves as the criterion for the resolution.

The shutting surface 13 is finely adjustable in the direction of the measuring light axis 11 so that edge 12 can be set at exactly the same distance from objective lens 7 as the copying original copy 20.

Handle 18 is rigidly connected with slide 8 so that with it the objective lens can easily be pushed forward or backward.

On the reverse side of the objective lens carrier 5 a limit switch 19 is mounted which switches on the measuring light source 14 as soon as the slide 8 is situated in the focusing position.

What is claimed is:
1. In an electronic focusing arrangement for photographic enlargers having a projection table and wherein an image is reproduced on a projection plane by means of an objective lens and a copying light path with the original copy disposed in a copy window, the improvement comprising a measuring light source creating a measuring light path substantially parallel to said copying light path, a finely adjustable shutting surface disposed along the axis of said measuring light path, said surface having a test edge, a deflecting mirror disposed near said surface, a diaphragm disposed near said objective lens and movable at right angles to the axis of said measuring light path and at right angles to said test edge, and a light receiver on said projection table.

2. In the arrangement of claim 1 wherein a variable focus lens is disposed in said measuring light path.

3. In the arrangement of claim 1 wherein said window has a wide length and a narrow length, the distance between the copying light path axis and the measuring path axis being approximately half said narrow length whereby said objective lens in the measuring setting outside said test edge may also reproduce at least half of said original copy window thereby permitting the simultaneous consideration of the focal length as well as resolution.

4. In the arrangement of claim 3 wherein said objective lens is mounted on a slide, and limit switch means on said slide for switching on said measuring light source as soon as the objective lens is brought into the measuring position.

5. In the arrangement of claim 1 wherein said objective lens is mounted on a slide, and limit switch means on said slide for switching on said measuring light source as soon as the objective lens is brought into the measuring position.

6. In the arrangement of claim 2 wherein electromagnetic shutter means is arranged for said variable focus lens which is simultaneously actuated with the switching on of said measuring light source for opening its light path.

References Cited

UNITED STATES PATENTS 3,037,423   6/1962   Shurcliff _____ 355—57X

JOHN M. HORAN, Primary Examiner

R. A. WINTERCORN, Assistant Examiner

U.S. Cl. X.R.

355—61